(12) United States Patent
Orth et al.

(10) Patent No.: US 7,781,378 B2
(45) Date of Patent: Aug. 24, 2010

(54) PROTECTIVE COATING FOR ARRAY MATERIAL DEPOSITION

(75) Inventors: Reid N. Orth, Ithaca, NY (US); David M. Lin, Ithaca, NY (US); Theodore G. Clark, Ithaca, NY (US); Yung-Fu Chang, Ithaca, NY (US); Harold G. Craighead, Ithaca, NY (US); Jose Manuel Moran-Mirabal, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 1638 days.

(21) Appl. No.: 10/939,121

(22) Filed: Sep. 10, 2004

(65) Prior Publication Data

US 2006/0166218 A1   Jul. 27, 2006

Related U.S. Application Data

(60) Provisional application No. 60/502,416, filed on Sep. 12, 2003.

(51) Int. Cl.
C40B 50/00 (2006.01)

(52) U.S. Cl. .............................. 506/23; 506/7; 506/13; 435/6

(58) Field of Classification Search ....................... None
See application file for complete search history.

(56) References Cited

U.S. PATENT DOCUMENTS

| 5,968,745 | A |   | 10/1999 | Thorp et al. |   |
|---|---|---|---|---|---|
| 6,159,681 | A | * | 12/2000 | Zebala | ........................... 435/4 |
| 6,239,019 | B1 |   | 5/2001 | Chiang et al. |   |
| 6,559,474 | B1 |   | 5/2003 | Craighead et al. |   |

OTHER PUBLICATIONS

Ilic et al., Biomedical Microdevices 2(4):317-322 (2000).*
Albertson, Donna G., et al., "Genomic Microarrays in Human Genetic Disease and Cancer", *Human Molecular Genetics*, 12(2), (2003),R145-R152.
Derisi, Joseph L., "Exploring the Metabolic and Genetic Control of Gene Expression on a Genomic Scale", *Science*, 278(5338), (1997),680-686.
Fodor, Ervin, et al., "Photochemical Cross-Linking of Influenza A Polymerase to its Virion RNA Promoter Defines a Polymerase Binding Site at Residues 9 to 12 of the Promoter", *Journal of General Virology*, 74(Part 7), (1993),1327-1333.

Gerhold, David L., et al., "Better Therapeutics Through Microarrays", *Nature Genetics*, 32 (Supp.), (2002),547-552.
Hughes, Timothy R., et al., "Expression Profiling Using Microarrays Fabricated by an Ink-Jet Oligonucleotide Synthesizer", *Nature Biotechnology*, 19(4), (2001),342-347.
Ilic, B., et al., "Topographical Patterning of Chemically Sensitive Biological Materials Using a Polymer-Based Dry Lift Off", *Biomedical Microdevices*, 2(4), (2000),317-322.
Kononen, Juha, "Tissue Microarrays for High-Throughput Molecular Profiling of Tumor Specimens", *Nature Medicine*, 4(7), (1998),844-847.
Moody, M. D., et al., "Array-Based ELISAs for High-Throughput Analysis of Human Cytokines", *BioTechniques*, 31(1)), (2001),186-190; 192-194.
Nisenbaum, L. K., "The Ultimate Chip Shot: Can Microarray Technology Deliver for Neuroscience?", *Genes Brain and Behavior*, 1(1) (2002),27-34.
Oliphant, Arnold, et al., "BeadArray™ Technology: Enabling an Accurate, Cost-Effective Approach to High-Throughput Genotyping", *BioTechniques*, 32(Supp.), (Jun. 2002),S56-S61.
Orth, Reid N., et al., "Mast Cell Activation on Patterned Lipid Bilayers of Subcellular Dimensions", *Langmuir*, 19(5), (2003),1599-1605.
Schena, Mark, "Quantitative Monitoring of Gene Expression Patterns with a Complementary DNA Microarray", *Science*, 270(5235), (1995),467-470.
Schlecht, Ulrich, et al., "Mining Meiosis and Gametogenesis With DNA Microarrays", *Reproduction*, 125(4), (2003),447-456.
Silzel, John W., et al., "Mass-Sensing, Multianalyte Microarray Immunoassay With Imaging Detection", *Clinical Chemistry*, 44(9), (1998),2036-2043.
Singh-Gasson, Sangeet, et al., "Maskless Fabrication of Light-Directed Oligonucleotide Microarrays Using a Digital Micromirror Array", *Nature Biotechnology*, 17(10), (1999),974-978.
Tran, Peter H., et al., "Microarray Optimizations: Increasing Spot Accuracy and Automated Identification of True Microarray Signals", *Nucleic Acids Research*, 30(12)(e54), (2002),9 pgs.

(Continued)

*Primary Examiner* — Jeffrey S. Lundgren
(74) *Attorney, Agent, or Firm* — Schwegman, Lundberg & Woessner, P.A.

(57) ABSTRACT

An array is formed with a protective cover on a substrate. The protective cover is patterned to produce an array of openings to the substrate. Desired material is deposited on the substrate through the openings. The protective cover may then be removed. In one embodiment, the protective cover is a conformal polymer, such as di-para-xylylene. It may be removed by mechanical peeling. The material may be biological material such as DNA. The protective cover may be used to prevent non-specific hybridization in inter-spot regions by performing hybridization with the cover still in place. Hybridization that occurs in such regions between the spots may be removed with removal of the protective cover.

15 Claims, 3 Drawing Sheets

OTHER PUBLICATIONS

Tusher, Virginia G., et al., "Significance Analysis of Microarrays Applied to the Ionizing Radiation Response", *Proc. Natl. Acad. Sci.*, 98(9), (2001),5116-5121.

Vrana, Kent E., et al., "Use of Microarray Technologies in Toxicology Research", *Neurotoxicology*, 24(3), (2003),321-332.

Yang, Yee H., et al., "Normalization for cDNA Microarray Data: A Robust Composite Method Addressing Signal and Multiple Slide Systematic Variation", *Nucleic Acids Researchs*, 30(4)(e15), (2002),10 pgs.

\* cited by examiner

PROTECTIVE COATING FOR ARRAY MATERIAL DEPOSITION

RELATED APPLICATION

This application claims priority to U.S. Provisional Application Ser. No. 60/502,416 (entitled EM CHIPS-ENHANCED MICROARRAY CONSTRUCTION AND HYBRIDIZATION IMPROVMENETS USING A POLYMER SURFACE, filed Sep. 12, 2003) which is incorporated herein by reference.

GOVERNMENT FUNDING

The invention described herein was made with U.S. Government support under Grant Number 0124938 awarded by the National Science Foundation (NSF). The United States Government has certain rights in the invention.

BACKGROUND

Arrays of biological material have become a core technology used to advance studies in numerous fields. A variety of such arrays have been developed, including DNA microarrays, protein/antibody microarrays, and tissue microarrays indicating the broad appeal and utility of this approach. The explosion in popularity of arrays has led to an equally dazzling explosion of data that can be gathered from biological processes. Arrays have been used in studies on the nervous system, cancer, environmental toxicology, and reproductive biology. Microarrays may eventually produce personalized medical information for individual patients. These are just a few of the numerous applications for microarrays that have been published to date.

DNA arrays, in particular, have become an attractive means of studying biological processes. In these arrays, DNA fragments are positioned at high density on a solid support, such as on glass slides or on nylon membranes. To apply the DNA, robotics are used to "spot" or spray DNA on the surface at set intervals. The array therefore comprises a large number up to ~100,000 with current technology) of individual spots of DNA located at discrete intervals on the slide. A competing technology that has also been heavily used are Affymetrix arrays, which use photolithography to synthesize DNA in situ on silicon wafers.

The explosion in popularity of such arrays has led to the introduction of numerous novel array methodologies, including new means of printing arrays (e.g. different means of depositing DNA on the array surface), novel array platforms (e.g. those not employing traditional glass or nylon based supports;), and array analysis packages (e.g. commercial or academic software).

It has become increasingly obvious, however, that current array technology, while still evolving, is limited by methodological and technological barriers that limit the sensitivity, and therefore the utility, of the technique. The utility is limited by a failure to achieve uniform deposition of materials on the array and a failure to eliminate non-specific hybridization to the array. The ability to improve either of these critical areas would greatly increase the utility and sensitivity of microarray techniques.

SUMMARY

An array is formed with a protective cover on a substrate. The protective cover is patterned to produce an array of openings to the substrate. Desired material is deposited on the substrate through the openings. The protective cover may then be removed.

In one embodiment, the protective cover is a conformal polymer, such as di-para-xylylene. It may be removed by mechanical peeling. The material may be biological material such as DNA.

In one embodiment, the protective cover includes at least two layers. For example, the first layer may be polyethylene oxide, and the second may be a conformal polymer. Each layer could be individually patterned and modified.

In one embodiment, the array is an array of spots of biological material adhered to the substrate. The biological material is substantially uniformly distributed within each spot.

In yet a further embodiment, the protective cover is left in place during hybridization and is used to prevent non-specific hybridization in inter-spot regions. Hybridization that occurs in such regions between the spots may be removed with removal of the protective cover.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1A:
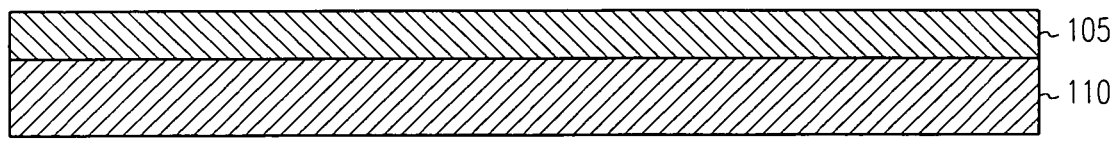
FIGS. 1A, 1B, 1C, 1D, 1E, 1F, 1G and 1H are cross section block representations of an example process for forming and using biological microarrays.

FIGS. 1A through 1H are cross section block representations of an example process for forming and using biological microarrays. In FIG. 1A, a protective layer 105 is formed on a substrate 110. In one embodiment, the protective layer 105 comprises a conformal polymer layer that is vapor deposited on the substrate 110, such as silicon substrate. The polymer layer is Parylene C or di-para-xylylene in one embodiment. Other materials with desired characteristics may also be used. Multiple materials may be deposited sequentially or simultaneously. The protective layer 105 adheres somewhat weakly to the surface of the substrate 110.

Figure 1B:
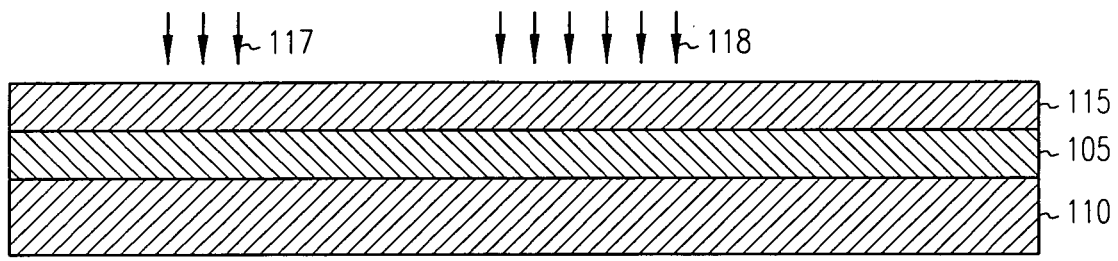

In FIG. 1B, a photoresist, or other type of patterning layer 115 that may be used to form patterns using photolithography type techniques is applied on top of the protective layer 105. The patterning layer 115 is selectively exposed to light as indicated at 117 and 118. While a positive resist is indicated, negative resists may also be used, as well as other patterning type layers that are used for different types of patterning, such as x-ray lithography or microcontact printing.

Figure 1C:
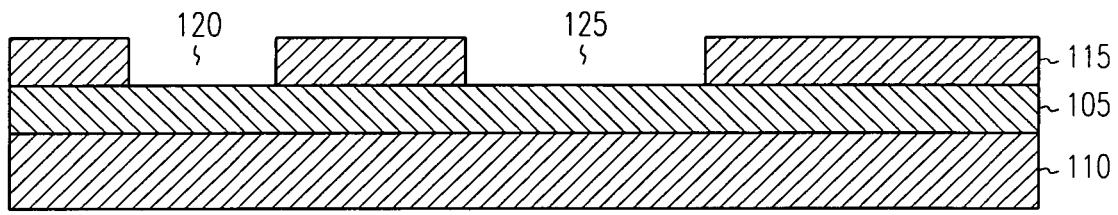

In FIG. 1C, the exposed portions of the patterning layer 115 are removed, leaving openings 120 and 125 of various desired sizes. FIGS. 1A through 1H only show two such openings, but are representative of an array of openings in just about any desired size, shape and pattern. An n×m array, where n and m are integers is formed in one embodiment. The number of openings may vary from one to thousands and more. The use of the patterning layer provides the ability to provide an array of spots of uniform desired size.

Figure 1D:
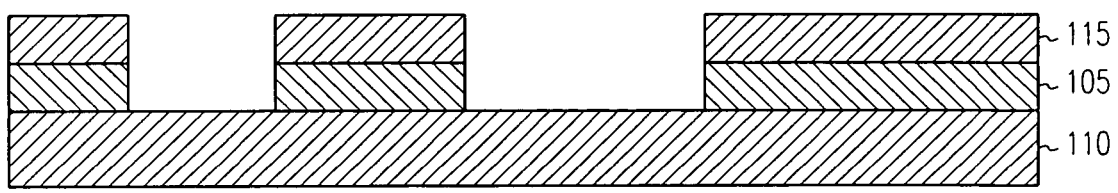
Figure 1E:

FIG. 1D illustrates the results of further etching of the protective layer where exposed in openings 120 and 125, forming spots on the substrate. In one embodiment, reactive ion etching is used to pattern the Parylene. The patterning layer 115 is then removed as seen in FIG. 1E.

Figure 1F:
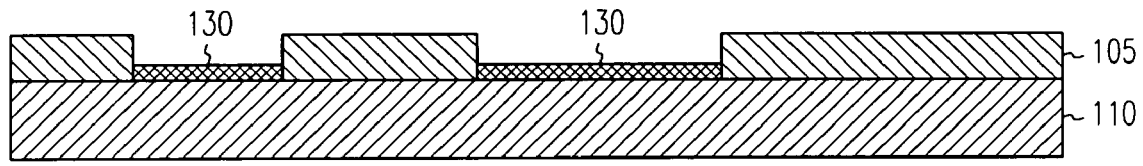

The surface of substrate 110 exposed through openings 120 and 125 may be functionalized as indicated in FIG. 1F prior to application of biological materials. For a DNA material, a silane treatment (3-APTS) indicated at 130 enhances DNA adsorption to the surface. Further chemical procedures may be used to covalently link many different types of molecules.

Figure 1G:
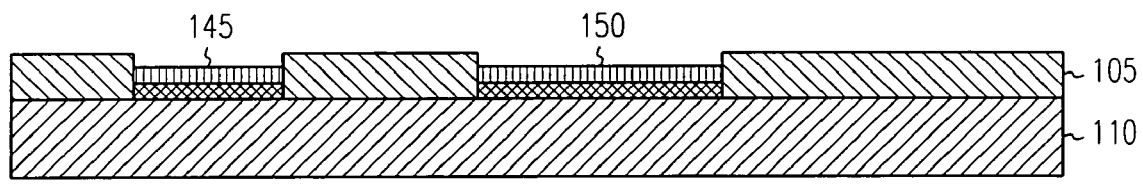
Figure 1H:
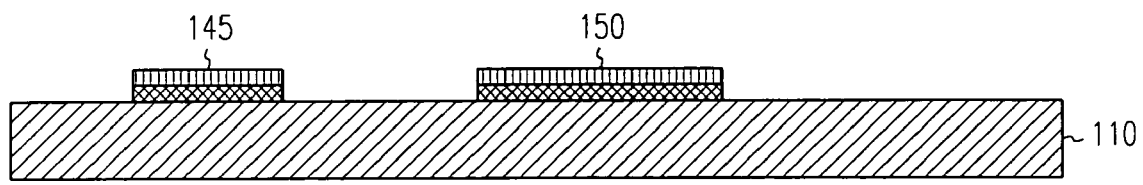

In FIG. 1G, a material 145 and 150 is applied. The material may be a biological material in one embodiment, or metals, or other non-biological material, such as polystyrene beads, to which biological materials can be attached. The material binds to substrate 110 in areas defined or constrained by the openings 120 and 125. It may also bind to the remaining protective layer 105. As seen in FIG. 1H, removal of the protective layer 105 removes the material that was not bound to the substrate, leaving well defined spots 145 and 150 of the material. In one embodiment, the protective layer is removed by simple peeling it off in a single continuous sheet, leaving the defined spots 145 and 150 essentially intact and undamaged by processing steps.

The protective layer 105 provides the ability to constrain arrays with very small openings. This can result in increased sensitivity which may be due to increased uniformity of deposition when the array is hybridized after removal of the protective layer 105.

In one embodiment, hybridization of a biological material is alternatively performed after removal of the protective layer 105, or prior to removal of the protective layer 105. Ideally, binding only occurs on the biological material spots that have been formed. However, some inter-spot binding may occur, which could lead to difficulty in detecting and processing data from the array. If hybridization occurs prior to removal of the protective layer 105, the inter-spot binding occurs on the protective layer 105, it is removed with the protective layer, providing an array with binding essentially only in the desired spots. This can increase the signal to noise ratio when reading the hybridized arrays, since there is little if any interspot hybridization to contribute to noise. When coupled with the increased sensitivity provided by the constrained spots of biological material, the overall sensitivity of the array is greatly increased.

Figure 2:
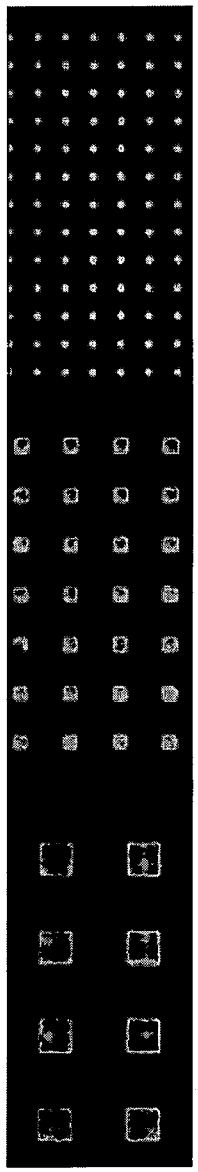
FIG. 2 is a fluorescent image of an example microarray of autofluorescent DNA deposited using the process of FIG. 1.

In one embodiment, Parylene-coated substrates are generated containing a variety of different sized patterns as seen at 200 in FIG. 2. Uniform patterns may be created on glass slides, mimicking current existing technologies, or may be formed on silicon or other substrates as desired. In FIG. 2, the patterns are formed with square shaped spots ranging from 30 um to 1 um. Other sizes and shapes, such as circles, ovals, triangles etc., may also be formed.

Fluorescent DNA may be obtained by ordering a commercially synthesized oligonucleotide that had been conjugated to a fluorescent chromophore (FITC). The FITC-coupled oligo may then be applied to a Parylene coated substrate and imaged with fluorescent microscopy. One example produced is that shown in FIG. 2 at 200. DNA deposition occurs in spaces created by the pattern in this initial test condition. Moreover, as the size of the opening decreases, deposition appears to become highly uniform, as evidenced by the even, fluorescent image. DNA can be deposited on the surface of the Parylene-array, thereby simulating the "printing" of arrays with DNA.

Patterning of the protective layer helps constrain the deposition and drying of the biological material, such as DNA. This improves uniformity of the biological material spots. Uniformity may be due to increasingly constraining the DNA corresponding to the smaller spot size. The method of forming an array described herein also provides patterns that are better defined than that which could be achieved by spotting alone.

In standard DNA microarray experiments, the DNA is spotted onto the array, but the DNA itself does not fluoresce. This array is then hybridized with a fluorescently labeled population of nucleic acids. Excess, unbound fluorescent nucleic acid is washed away, and the slide is then scanned. In order to mimic this procedure, non-fluorescently-labeled DNA may be spotted on the surface of a Parylene-array using a microarrayer. This unlabeled DNA may be a mixture of a variety of different DNAs, and will hybridize to fluorescently labeled nucleic acid made from various tissues.

After the printed, Parylene-array is produced, a Cy5 fluorescently labeled population of cDNA is produced by standard means (www.microarrays.org; aminoallyl labeling protocol). This Cy5-labeled population is then applied to the Parylene-array. Note that the Parylene has not been removed, and functions to protect the inter-spot regions. After hybridization, excess, unbound Cy5-DNA may be removed by washing.

Figure 3:
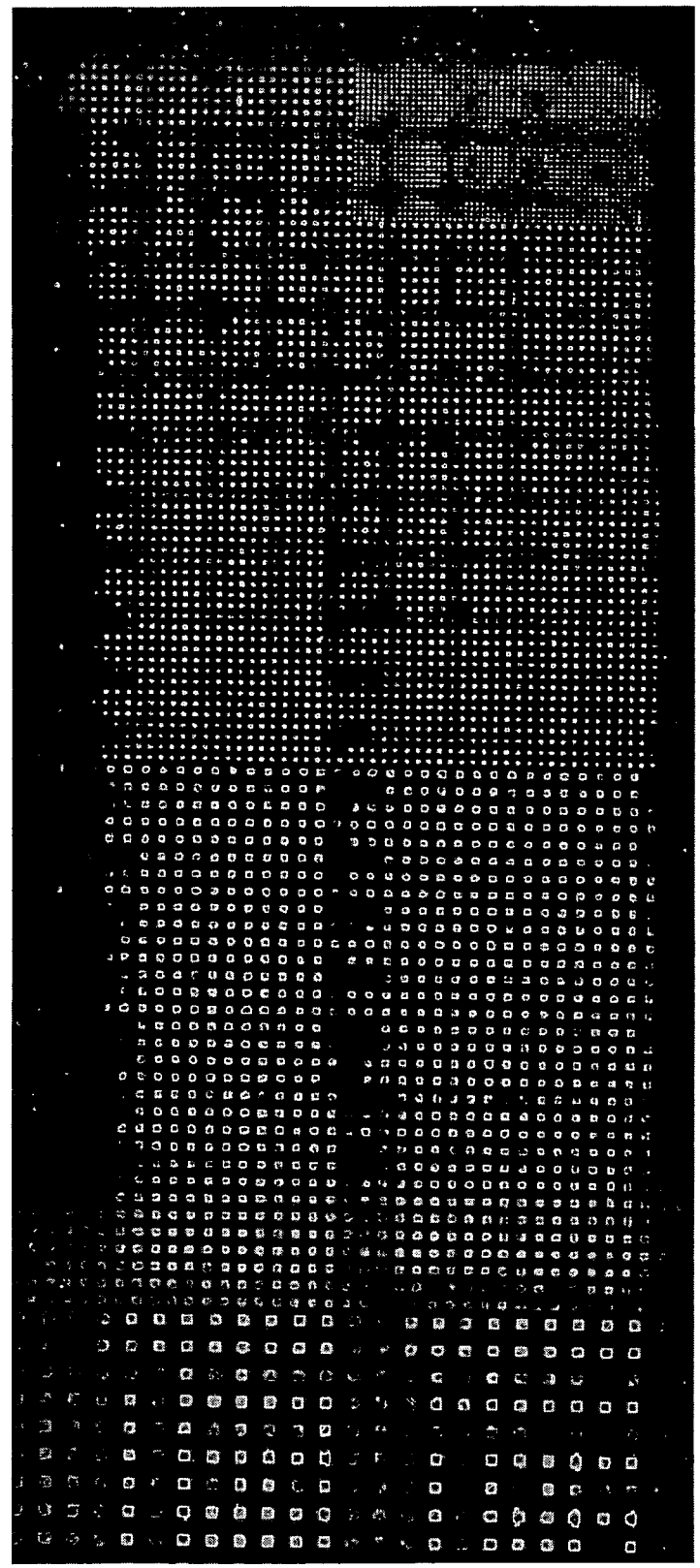
FIG. 3 is an image created by a commercial microarray reader of an example hybridized DNA microarray using the process of FIG. 1.

After washing, the Parylene is then peeled off of the array. In principle, this will remove non-specific hybridization from inter-spot regions, as well as leaving behind specific signal bound to spotted DNA. An example array formed using this process is shown in FIG. 3. It was visualized by employing a commercial microarray reader. As can be seen, specific hybridization occurs to DNA bound within the openings left by the Parylene. Moreover, there is very low inter-spot hybridization.

This concept can be multiplexed and reiterated. Different cover materials may be deposited on a substrate that can be individually patterned. In one embodiment, polyethylene oxide is deposited on a substrate prior to deposition of di-para-xylylene. The di-para-xylylene is patterned first, and materials are deposited within the pattern. The polyethylene oxide layer may then be subsequently patterned to produce openings within the deposited material.

Biological material is constrained to desired spots on substrate, forming a pattern, such as an array. By forcing spotted materials into user-defined regions of the array, an increase in uniform deposition can be accomplished. In one embodiment, a polymer, di-para-xylylene (Parylene C), is used. It can be vapor-deposited on any given substrate and patterned using standard photolithographic techniques. The result is the creation of microfabricated openings of defined dimensions that expose the underlying substrate surface.

Materials applied to the surface of a Parylene-patterned array weakly bind to the underlying substrate via openings in the Parylene, and not to portions of the substrate that are not exposed. The prefix, "micro" is used throughout this description, and is not meant to be limiting. It is merely reflective of current trends to conserve the use of biological materials by reducing dimensions of devices.

The Parylene also provides a protective coating between spots on the array. Non-specific hybridization to interspot regions can lead to high levels of background signal. This background signal can obscure any true signal bound to the spot itself. In one embodiment, the protective layer is hydrophobic. This provides a protective barrier to prevent non-specific binding to interspot regions. The protective barrier can be removed after sample hybridization. As a result, any non-specific binding that may have occurred to the barrier will also be removed. Parylene C is used in one embodiment to protect the inter-spot regions. Parylene adheres weakly to various substrates, and is easily removed after hybridization. By improving uniformity and reducing non-specific hybridization, the utility and sensitivity of microarray techniques may be enhanced.

The methods described herein are not limited to any particular polymer, substrate, spotting method, hybridization method, or scanning method. Given the pace with which developments are made in microarray technology and in polymer chemistry, we envision that other polymers will eventually be developed whose properties may exceed that of Parylene C. For example, these next-generation polymers could simply be dissolved with a particular solvent rather than mechanically removed. A novel substrate other than glass may prove to have better retentive properties and able to bind larger quantities of DNA. New spotting methods, such as inkjet printing, may become more widespread. Moreover, it is likely that the size of microarrays will shrink even further. Array scanners are likely to improve in resolution and will be able to image smaller and smaller spots. Other fluorescent dyes and hybridization protocols may be developed.

The methods described are not limited to use in connection with only one protective cover. Methods suitable for use in connection with the processes described above include forming a plurality of protective covers over the surface of a substrate, forming a stack of a plurality of protective covers on a substrate, and forming a stack of a plurality of protective covers on a plurality of protective covers formed over the surface of the substrate. Further, openings can be provided that penetrate the plurality of protective covers to the substrate. And openings can be provided that penetrate fewer than the number of the plurality of protective covers necessary to penetrate to the substrate. Thus, materials, such as biological materials, pharmaceutical materials, and DNA, can be processed in the openings formed in the plurality of protective covers independent of whether the openings penetrate to the substrate. Further, the methods include removing one or more of the protective covers from the plurality of protective covers in the processing of the desired materials.

A method comprising: forming a pattern of a plurality of protective covers formed from a plurality of materials on a substrate; selectively patterning a first one of the plurality of protective covers to produce a first array of openings to the substrate; selectively patterning a second one of the plurality of protective covers to produce a second array of openings to the substrate; and removing one or more of the plurality of protective covers.

The method further comprising depositing a first desired material on the substrate through the first array of openings to the substrate, depositing a second desired material on the substrate through the second array of openings to the substrate, forming one or more protective covers on the plurality of protective covers and processing the plurality of protective covers and the one or more protective covers to form an array of openings into which to deposit one or more desired materials.

A further method comprising: forming a plurality of protective covers on a substrate; patterning a first protective cover of the plurality of protective covers to produce a first array of openings to the substrate; depositing a first desired material on the substrate through the openings; removing the first protective cover of the plurality of protective covers to expose a second protective cover of the plurality of protective covers; patterning the second protective cover of the plurality of protective covers to produce a second array of openings to the substrate; depositing a second desired material on the substrate through the second array of openings to the substrate; and removing the second protective cover of the plurality of protective covers.

Yet a further method comprising: forming a stack of a plurality of protective covers on a substrate; and processing the stack of the plurality of protective covers to form a plurality of sites on at least a plurality of the stack of the plurality of protective covers on which to deposit a desired material.

Still a further method comprising: forming a stack of a plurality of protective covers on a substrate; and processing the stack of the plurality of protective covers to form a plurality of sites on at least a plurality of the stack of the plurality of protective covers on which to deposit a desired material.

Yet still a further method comprising: forming a plurality of protective covers on a substrate; processing the plurality of protective covers to form one or more openings to the plurality of protective covers and one or more openings to the substrate; depositing a desired material in at least one of the one or more openings to the plurality of protective covers; and removing the plurality of protective covers.

A method comprising: forming a plurality of protective covers on a substrate; patterning a first protective cover of the plurality of protective covers to produce a first array of openings to the substrate; depositing a first desired material on the substrate through the openings; removing the first protective cover of the plurality of protective covers to expose a second protective cover of the plurality of protective covers; patterning the second protective cover of the plurality of protective covers to produce a second array of openings to the substrate; depositing a second desired material on the substrate through the second array of openings to the substrate; and removing the second protective cover of the plurality of protective covers.

In all of these instances, this invention could continue to contribute to increased uniformity and decreased non-specific hybridization. These features will undoubtedly remain critical in any new technological advance. Moreover, photolithographic techniques may be used to create nanometer-sized openings in the Parylene. While these concepts have been demonstrated with DNA microarrays, Parylene-arrays can be used to pattern other materials as well. These can be biological; e.g. cells, proteins, RNA, lipids; or non-biological e.g. metals. In addition, the described invention can be multiplexed and repeated with different materials, creating patterns within patterns.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
   forming a pattern of a plurality of protective covers formed from a plurality of materials on a substrate;
   selectively patterning, using a patterning layer to create a pattern, a first one of the plurality of protective covers to produce a first array of openings to the substrate;
   selectively patterning, using the patterning layer to create a pattern, a second one of the plurality of protective covers to produce a second array of openings to the substrate;
   removing one or more of the plurality of protective covers;
   depositing a first desired material on the substrate through the first array of openings to the substrate; and depositing a second desired material on the substrate through the second array of openings to the substrate; wherein at least one of the first and second desired materials comprises DNA; and further comprising hybridizing the DNA prior to removing respective protective covers.

2. The method of claim 1, further comprising:

forming one or more protective covers on the plurality of protective covers.

3. The method of claim 2, further comprising:

processing the plurality of protective covers and the one or more protective covers to form an array of openings into which to deposit one or more desired materials.

4. A method comprising:

forming a plurality of protective covers on a substrate;

patterning a first protective cover of the plurality of protective covers to produce a first array of openings to the substrate;

depositing a first desired material on the substrate through the openings;

removing the first protective cover of the plurality of protective covers to expose a second protective cover of the plurality of protective covers;

patterning the second protective cover of the plurality of protective covers to produce a second array of openings to the substrate;

depositing a second desired material on the substrate through the second array of openings to the substrate; and removing the second protective cover of the plurality of protective covers.

5. The method of claim 4 wherein at least one of the first and second desired materials comprises DNA.

6. The method of claim 5 and further comprising hybridizing the DNA prior to removing respective protective covers.

7. The method of claim 6 wherein the protective cover is removed by mechanical peeling.

8. The method of claim 6 wherein the DNA is hybridized with a fluorescently labeled nucleic acid.

9. The method of claim 6 wherein the protective cover comprises a polymer.

10. The method of claim 9 wherein the polymer is di-para-xylylene.

11. The method of claim 1 wherein the protective covers are removed by mechanical peeling.

12. The method of claim 1 wherein the DNA is hybridized with a fluorescently labeled nucleic acid.

13. The method of claim 1 wherein the protective cover comprises a polymer.

14. The method of claim 13 wherein the polymer is di-para-xylylene.

15. The method of claim 1, wherein the patterning layer comprises a photoresist.

* * * * *